2,795,502

METHOD OF MAKING SOY BEAN PRODUCTS

Charles A. Raymond, Baltimore, Md.

No Drawing. Application May 14, 1951,
Serial No. 226,283

4 Claims. (Cl. 99—98)

This invention relates to the preparation of new edible products from soy beans, and more particularly to products free from any objectionable taste or odor. One of my improved soy bean products is especially useful when employed as an addition to wheat flour dough in the making of baked goods such as risen bread.

The highly nutritive nature of soy bean material has been well known for centuries, and the desirability of incorporating such material in baked goods such as bread made from wheat flour, to improve its nutritive and other properties, has long been recognized.

However, most of the attempts heretofore made to incorporate soy bean material in wheat flour bread have been based upon the use of soy flour, and this has proven objectionable for several reasons. One reason is that it imparts a taste to the bread which is not acceptable to most people, and another reason is that soy flour, when added to wheat flour in any substantial amounts, reduces the elasticity and smoothness of the dough and interferes with gas-cell formation and rising process. This is due to the fact that soy flour is of a radically different nature from wheat flour, since it contains only a few percent of starch and no gluten. Even after being soaked in water for many hours, soy flour particles are not completely softened, but retain a certain harshness and grittiness. This is especially true of soy flour containing substantial quantities of oil, which is highly insoluble during the bread production process. These hard particles of soy flour become embedded in the wheat flour dough and weaken and puncture the gas cell walls. Furthermore, they have a frictional characteristic which tends to reduce the free movement of the dough in rising. The result is a loaf of inferior quality.

An important object of this invention is to produce an improved soy bean material, suitable for incorporation in wheat flour bread which has none of the objectionable and undesirable qualities of soy flour.

Another object is to provide a moist soy bean material of such a nature that, when combined with wheat flour in the dough, it will be properly conditioned during the normal fermentation period necessary for wheat flour dough. To this end, I contemplate an improved material which is already partially fermented when introduced into the dough.

Yet another object of the invention is to produce a soy bean material of such a nature that, when combined with wheat flour it will tend to increase the keeping qualities and delay the staling of baked goods.

A further object of the invention is to devise a process for treating soy beans so as to produce a palatable material free from objectionable taste or smell, and satisfactory for use as a food, either in the form of whole processed beans, cracked or coarsely ground beans, or a jellied paste capable of being employed as a salad dressing or sandwich spread, or which can be added to, combined with or substituted for a large variety of foods.

A specific object is to provide soy bean material, either whole beans or in pieces, which shall have a crisp, brittle and tender quality like nut meats and raw fresh vegetables and fruits, and which shall therefore be desirable for use in salads in combination with the raw foods ordinarily employed, and as a high protein supplement to such foods. This product will also be capable of being preserved by quick freezing, and will retain its desirable qualities atfer thawing.

Still further objects of the invention are to produce a soy bean material of a relatively light color, and to produce an improved, palatable oil suitable for cooking or table use, or for mixing with other edible oils.

With the above and other objects in view, the invention consists in the methods and products described in the following specification and defined by the appended claims.

In preparing my improved products, I proceed as follows:

I take selected, clean, mature soy beans, either whole or in pieces, and first immerse them in a bath consisting of a mild aqueous solution of ammonium carbonate or bicarbonate, such, for example, as from 1% to 3%. The beans are soaked in this solution for about 10 hours at room temperature of 70° to 80° F., during which time a certain amount of fermentation takes place due to the natural enzymes present in the beans.

In the above described processing, the ammonium compound aids in the saturation of the beans with the solution. It also has a special tenderizing, softening and dissolving effect on the beans and penetrates into the oil cells, and, by its chemical action and evolution of gas, helps to break down the bean material and destroy completely the objectionable bean flavor and odor.

In my prior Patent No. 2,329,080, dated September 7, 1943, I disclose the idea of treating soy beans with ammonium bicarbonate. In this patent, however, the beans were first boiled before being treated with the ammonium bicarbonate. I now find that by treating them with the ammonium bicarbonate as a first step, while in the raw state, before anything else is done, and at room temperature, very much better results can be obtained, as stated in the preceding paragraph, and especially as to taste and texture.

The soy bean oil itself is definitely affected by the fermentation and by the treatment with the ammonium compound, since, when oil is subsequently extracted from beans so treated, it is found to be entirely free from any objectionable taste, and to have acquired to a substantial extent, an anti-oxidizing property. Under unagitated processing, as above described, a small percentage of the natural content of oil is removed from the bean material, probably not more than about 1%. As showing that the above processing actually breaks down the oil cells, it is found that, by severe agitation, as much as 25% of the oil may be extracted.

Although as above pointed out, the natural enzymes present in the beans will cause fermentation, active yeast and yeast food is preferably added to the above mentioned ammonium compound solution to the extent of from about 1% to 5%. By "active" yeast is meant yeast containing enzymic or other living organisms.

This yeast increases fermentation during the soaking period, which fermentation changes the materials into more soluble and digestible form. For example, the starches are more or less converted into sugars and the proteins into proteoses, and other well known desirable results obtained by yeast fermentation are brought about.

Enzyme preparations from fungus *Aspergillus oryzae* may also be advantageously added to the processing solution to supplement the yeast and soy bean enzymes, particularly preparations in which the proteolytic enzymes occur in larger proportions than the amylolytic enzymes or amylases. In this way the fermentation may be adjusted and controlled.

After the yeast is added the temperature is increased to a temperature of between 110° to 130° to decompose the ammonium compound and drive off the ammonia from the solution, as well as to complete the ammonia action on the material.

While the addition of yeast is desirable in many other cases, it is particularly advantageous if the soy bean material is to be incorporated in wheat flour dough in bread making, as hereinafter described. However, this yeast is not relied upon as a leavening agent in the bread making.

After the processing operation with the ammonium compound and yeast, the solution is drained off and the skins removed from the beans, if desired, by friction, in a manner similar to the removal of skins in the blanching of almonds and peanuts. During the processing of the beans, however, the skin or hull is rendered so tender and soluble that when the bean material is ground and homogenized as hereinafter described, the skin becomes incorporated in the resulting paste as an unidentifiable part thereof. Whether or not the skins are removed, the beans are then placed in a kettle where they are covered with water to a depth several inches above the beans so that they will be entirely submerged. The contents of the kettle is then brought to a simmering boil at atmospheric pressure which is continued for at least half an hour.

The boiling may be continued for a further period of from one-half to one and one-half hours, depending upon the particular product being prepared and the purpose for which the material is intended. This boiling, of course destroys any further fermentative activity.

It has been found that cooking the whole beans in this manner results in a lighter colored product. If the bean material is in the nature of small pieces or particles, in order to avoid waste, and after the preliminary half hour boiling, the cooking may conveniently be continued in a steam pressure cooker for about thirty minutes at ten pounds' pressure. It is found that pressure cooking tends to produce a graying effect on the material, and consequently, it is not recommended in the case of whole beans where it is desirable to preserve a bright color.

In the case of bean material in the form of pieces or particles, the skin fragments may be removed by screening.

After the above described cooking operation, the bean material in the form of whole or cracked beans is drained of the cooking water. This material is edible and palatable, and may be eaten as any other food. It may also be mixed with other foods. An exceptionally desirable dish may be prepared by mixing the material with suitable sauce or other ingredients and baking in the oven, after the manner of ordinary baked beans. This bean material may also be dried or dehydrated, and ground into a powder, for incorporation in bread.

The processed bean material, as above described, if not dehydrated, contains about 70% of water, that is to say, one pound of raw beans will absorb about two and a third pounds of water, thus making about three and a third pounds of the processed product. As much of this water as desired can, however, be removed by centrifuging.

When it is desired to produce a soy bean product having a crisp, brittle consistency, suitable for use in salads, as mentioned in the preamble, the beans are processed with the ammonium compound, as above described, but without the addition of yeast, and, after draining, are placed in pure cold water, and heated until a boiling temperature is reached. This heating serves to decompose the ammonium compound and drive off the ammonia. The boiling is continued for only five to fifteen minutes, and then the beans are drained, and chilled in ice cold water. They may then be quick frozen, if desired.

The length of boiling time will vary with the character and maturity of the beans, old beans requiring a longer time than newer ones.

When the boiling is properly timed, the resulting product, whether served immediately after processing or after having been frozen and thawed, will be found to have the firm, crisp, nut-like quality desired.

The chief difference between the process for producing this salad material, and for producing the other bean materials described herein lies in the boiling time factor.

As above explained, the processed bean material contains substantially all or at least the major portion of the oil originally present in the raw beans. This oil can be extracted from the processed bean material by any well known suitable method, such as pressing or dissolving out with solvents, for example, alcohol or benzene. I find that the oil so extracted is completely free from any objectionable taste or odor, and constitutes a valuable food product. It may, for example, be used, either alone, or mixed with other edible oils, for cooking, as a shortening, or as a salad oil.

If, however, it is desired to prepare a product suitable for incorporating in wheat flour dough, or for other suitable purposes, the bean material is ground to a mash. It is then homogenized to a very finely divided or colloidal condition. In this condition, it may be used either by itself or mixed with cereal products or other materials as a sandwich spread, or as an ingredient in making meat loaves. Due to the fact that my improved soy bean product consists largely of protein, the nutritive and other desirable qualities of the meat loaf are not impaired by the addition of such product. The homogenized soy bean material, either alone, or mixed with cereal preparations, may also be employed in the manufacture of other food products, such, for example, as ready-to-serve breakfast food. In making a product of this kind, the homogenized paste may be extruded from small openings to form strings or shreds, and then browned by dry heat, as in an oven. Since the material is partially aerated, the minute air bubbles expand and thus give to the finished product a somewhat puffed and porous quality.

The homogenized, colloidal material contains a major portion of the natural oil which was present in the original soy beans, and this oil is probably emulsified to some extent during the grinding and homogenizing process. For some purposes, however, I preferably treat the material further to thoroughly emulsify the same, so as to produce a smooth creamy paste having a jelly-like quality. The complete emulsification of the material is aided by the lecithin present, so that the water or moisture in the paste is bound up with the oil and imprisoned. This makes the particles smooth and well lubricated so that they move freely over each other, or over or among particles of other materials.

This emulsified, jellied paste is of a soft, salve-like character, and is so fine that when rubbed on the human skin it disappears into the pores. It is also highly aerated and completely filled with tiny air cells.

If this paste is to be used within any reasonable time after being prepared, it is packed in closed containers and kept under refrigeration at a temperature just above the freezing point. Otherwise, it can be preserved indefinitely by canning or by quick freezing and is then re-emulsified before using.

The creamy, aerated, emulsified paste, above described, containing about 70% of water, can be employed either alone or mixed with other ingredients as a salad dressing, or the like, and may also be used for the manufacture of ready-to-serve breakfast foods, as above described, in which the aeration is an advantage. But an outstandingly important use is as an addition to the dough in the making of risen bread from wheat flour. Owing to the consistency and smoothness of this material, it does not interfere with the normal fermentation and rising of wheat flour dough as does soy bean flour. This is proven by the excellent crumb texture and extra good volume of the resulting loaf.

Furthermore, when yeast is used in the original processing solution, as above described, the soy bean material becomes partially fermented. Normally, fermentation takes place more slowly in soy bean material than in wheat flour dough, and if soy bean material is added to wheat flour dough and an attempt is made to subject such dough to the usual fermentation, it will be found that the soy bean material lags behind the wheat flour, and that if this fermentation is continued long enough to obtain the desired condition of the soy bean material, the wheat flour dough becomes overconditioned or fermented, thus making it impossible to obtain a loaf of desired quality.

By my improved process, the soy bean material is given an initial fermentation, so that when introduced into the wheat flour dough it is already partially fermented or conditioned. The extent of this preliminary or partial fermentation of the soy bean material should be such that the time required to complete the desired fermentation or conditioning when introduced into the dough is substantially the same as the total time required for the optimum fermentation of the wheat flour. By this means, a mixture of wheat flour and soy bean material is produced, all parts of which will complete the fermentation process at substantially the same time, and hence a perfect loaf may be produced.

In practice, my improved jellied, emulsified paste may be mixed either with the sponge or directly with the wheat flour dough. The moisture locked in this emulsified paste is distributed throughout the loaf and has a very definite stabilizing effect on the moisture relations and, regardless of what may happen to the free moisture present in the starch, protein, gluten, etc., this locked in moisture in the soy bean material to a large extent remains undisturbed.

The introduction of this locked in moisture into the dough results in the loaf carrying an excess of moisture over normal, and because it is locked in or combined with the oil in the paste, no deduction is made in the normal amount of moisture used in the dough until the amount of soy bean material exceeds 20% of the amount of wheat flour. Thereafter, a definite amount of moisture, such as one third of a pound, is deducted for each pound of emulsified paste added. This results in maintaining an amount of moisture above normal in all loaves whether they contain less than or more than 20% of soy bean material, and thus the dough so constituted is capable of satisfactory use in automatic production equipment.

It has been suggested that the staling of bread is due, to some extent at least, to the formation of so-called hydrogen bonds or bridges, but the relatively high temperatures to which my improved soy bean material has been subjected tends to prevent the formation of such bonds or bridges. In other words, throughout the loaf, my improved material does not act like the wheat flour material in this respect.

Furthermore, since the emulsified jellied paste is well distributed throughout the amylose and amolopectin starch molecules, it interferes with the formation of the hydrogen bonds or bridges in the wheat flour.

In any event, whatever the theory may be, I have found that the addition of my improved soy bean paste or powder to wheat flour dough results in definitely increasing the elasticity and improving the keeping qualities of the loaf, and in definitely delaying staling.

I have found by experiment that bread made from high quality wheat flour loses its elastic and flexible quality in 3 to 4 days, while bread containing substantial quantities of my improved soy bean material still exhibits some elastic and flexible qualities after 10 days. It also still has a moist feeling not found in ordinary wheat bread 3 to 4 days old.

By the combined action of the ammonium compound, fermentation and heat, I obtain a bleaching effect which results in a paste product of much lighter color than soy bean flour. Thus substantial quantities may be added to wheat flour dough without reducing the whiteness of the loaf to any objectionable extent.

What I claim is:

1. The method of preparing a palatable soy bean product which comprises first soaking mature raw beans in their natural state at room temperature in water in which is dissolved a small percentage of an ammonium salt selected from the group consisting of ammonium carbonate and bicarbonate, the soaking being continued for about 10 hours, whereby a certain amount of fermentation takes place, draining off the solution, thereafter immersing the beans in fresh water and bringing them to a boil at no more than atmospheric pressure, continuing this boiling to cook the beans until they have become as soft as desired, and then draining off the cooking water.

2. The method of preparing edible, palatable soy bean products which comprises first subjecting mature, raw beans in their natural state to a treatment including soaking them at room temperature in water to which has been added a small percentage of an ammonium salt selected from the group consisting of ammonium carbonate and bicarbonate, to produce partial fermentation and to remove the objectionable taste, and then boiling the beans in an open kettle at atmospheric pressure until as soft as desired.

3. The method of preparing a palatable soy bean product comprising soaking mature beans in their natural state at room temperature in water in which is dissolved a small percentage of an ammonium salt selected from the group consisting of ammonium carbonate and bicarbonate, continuing such soaking for about 10 hours to produce partial fermentation, then draining off the solution, and finally cooking the beans at a temperature of approximately 212° F. to destroy any further fermentative activity.

4. The method of making bakery products from wheat flour mixed with the usual ingredients which includes adding to the dough suitable amounts of soy bean material prepared by subjecting substantially whole, mature, raw soy beans to partial fermentation and thereafter grinding them to a finely divided state, the extent of said partial fermentation being such that the time required to complete the fermentation of said soy bean material to the desired degree is substantially the same as the time required for the optimum fermentation of the wheat flour dough.

References Cited in the file of this patent

UNITED STATES PATENTS

| | | |
|---|---|---|
| 692,743 | Warr | Feb. 4, 1902 |
| 1,225,878 | Simons | May 15, 1917 |
| 1,356,988 | Johns | Oct. 26, 1920 |
| 1,824,448 | Satow | Sept. 22, 1931 |
| 1,843,051 | Thiele | Jan. 26, 1932 |
| 2,045,468 | Horvath | June 23, 1936 |
| 2,051,017 | Schwarz | Aug. 11, 1936 |
| 2,130,087 | Hasbrouck | Sept. 13, 1938 |
| 2,141,455 | Weizmann | Dec. 27, 1938 |
| 2,217,264 | Weizmann | Oct. 8, 1940 |
| 2,280,046 | Musher | Apr. 14, 1942 |
| 2,316,458 | Scalise | Apr. 13, 1943 |
| 2,329,080 | Raymond | Sept. 7, 1943 |
| 2,554,479 | Wolff | May 22, 1951 |

FOREIGN PATENTS

| | | |
|---|---|---|
| 18,936 | Great Britain | of 1900 |

OTHER REFERENCES

Harvath: Food Industries, January 1935, pages 15–16.

Bailey et al.: Cereal Chemistry, vol. XII, No. 5, September 1935, pages 467–472.

Hafner: The Baker's Digest, December 1942, pages 282 to 284.

Markley: vols. I–II, Soybeans and Soybean Products, 1951, pages 9, 951, 952, 955, 957, 958, 959.